July 21, 1970  H. R. ESPIG ETAL  3,521,532
HYDRODYNAMIC BEARINGS
Filed July 17, 1968  4 Sheets-Sheet 1

INVENTORS
HANS ROGER ESPIG
PETER MICHAEL MYATT PRICE
GLYN ALAN VINNICOMBE
BY

ATTORNEYS

INVENTORS
HANS ROGER ESPIG
PETER MICHAEL MYATT PRICE
GLYN ALAN VINNICOMBE
BY

ATTORNEYS

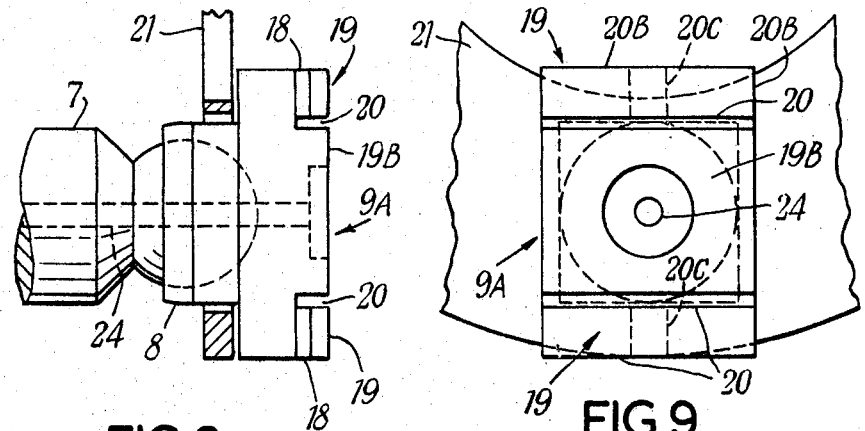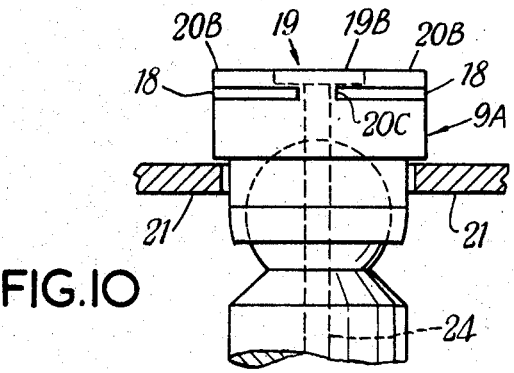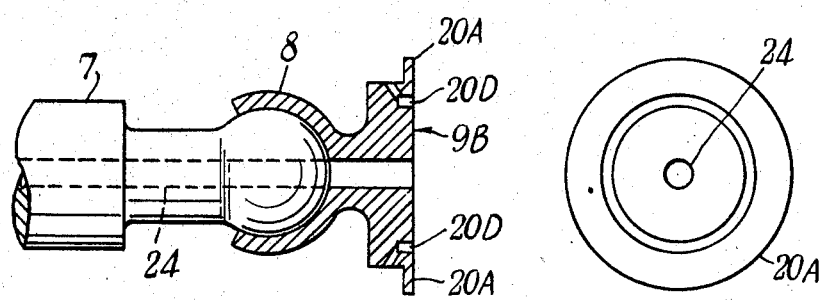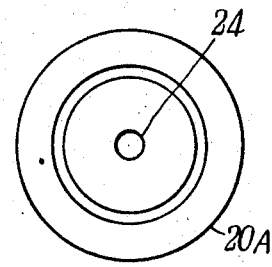

July 21, 1970  H. R. ESPIG ETAL  3,521,532
HYDRODYNAMIC BEARINGS
Filed July 17, 1968  4 Sheets-Sheet 4

INVENTORS
HANS ROGER ESPIG
PETER MICHAEL MYATT PRICE
GLYN ALAN VINNICOMBE
BY
ATTORNEYS

United States Patent Office 3,521,532
Patented July 21, 1970

3,521,532
HYDRODYNAMIC BEARINGS
Hans Roger Espig, Berkshire, Peter Michael Myatt Price, Surrey, and Glyn Alan Vinni Combe, Middlesex, England, assignors to Vickers Limited, London, England, a British company
Filed July 17, 1968, Ser. No. 745,479
Claims priority, application Great Britain, July 21, 1967, 33,797/67
Int. Cl. F01b *1/02, 13/04;* F16c *17/06*
U.S. Cl. 92—57     3 Claims

ABSTRACT OF THE DISCLOSURE

A piston pump or motor in which a hydrodynamic bearing is provided in association with two relatively rotatable components of the pump or motor. One of the components constitutes a slider and the other includes a bearing pad, the slider and pad having facing bearing surfaces. In use, the pad deforms under the action of the pressure of a liquid film between the bearing surfaces so that a film is created which is of nonuniform thickness and is convergent in the direction of motion of the slider with respect to the pad.

BACKGROUND AND SUMMARY OF THE INVENTION

The invention relates generally to piston pumps and motors and the teachings of the present invention are applicable both to radial and axial piston pumps and motors although the description with reference to the drawings deals exclusively with axial piston pumps and motors.

It has long been recognized that it should be possible to improve the efficiency of piston pumps and motors by reducing the frictional losses. These losses occur at the slipper pads/swash plate interface and cylinder barrel/port plate interface of an axial piston pump. Losses occur at the equivalent locations of a radial piston pump.

Many attempts have been made to overcome these disadvantages and the majority of these proposed solutions have been directed to improving the efficiency of the port plate/cylinder barrel interface of an axial piston pump (and equivalent region of the radial piston pump) for this is where the most considerable losses of efficiency occur. One solution which has met with considerable success consists of introducing a ball bearing between the facing surfaces of the cylinder barrel and port plate. This necessitates the formation of a groove in the two facing surfaces, the grooves receiving the races of the ball bearings. It will be understood that the high pressure fluid of the pump flows across the gap between the facing surfaces of the cylinder barrel and port plate. Consequently the thickness of this gap is critical for if it is too wide then the losses of high pressure fluid are excessive, and if it is too narrow friction losses are excessive. Hence precision ball bearings must be used and the tolerances which must be met in machining the grooves are extremely fine. As a result of this axial piston pumps constructed in this manner, while being extremely efficient in use, are extremely difficult and expensive to manufacture owing to the extremely fine tolerances which must be respected.

A further solution which has been proposed and tried consists of the use of conventional forms of hydrostatic bearing for maintaining the cylinder barrel and port plate at the desired spacing. However, hydrostatic bearings themselves have very considerable disadvantages in this particular application. For example, it is essential that they be supplied with lubricant under high pressure and that they possess an adequate degree of "stiffness". Stiffness is obtained by incorporating a restrictor in the lubricant supply line and this restrictor is generally of such small dimensions that it tends to become clogged by solid material in the lubricant. Stiffness has also conventionally been obtained by machining steps in the facing surfaces of the bearing, or by machining non-parallelism in the surfaces of the bearing. However, the height of the step or the requisite non-parallelism is so small that the surfaces tend to wear parallel after a short time of use. Once the surfaces are parallel the stiffness of the bearing is eliminated.

The present invention seeks to avoid the disadvantages set out above. The main object of the present invention is to provide a piston pump or motor which is less complicated to manufacture than the types described above but which does not suffer from any loss of efficiency due to the simpler manufacturing techniques employed.

The present invention therefore provides a piston pump or motor comprising first and second pump components which are relatively rotatable with respect to one another, one of said components comprising a slider having a bearing surface and the other of said components including a bearing pad having a bearing surface, the bearing surface of the pad facing the bearing surface of the slider and the bearing pad being adapted to deform under the action of the pressure of a liquid film which is created between the bearing surfaces of the pad and the slider upon relative motion occurring between the pad and the slider whereby said film is of non-uniform thickness and is convergent in the direction of motion of the slider with respect to the pad.

BRIEF DESCRIPTION OF DRAWINGS

Embodiments of the invention will now be described with reference to the accompanying drawings in which:

FIG. 8 is a side elevational view of a slipper pad suitable for use in the pump of FIG. 1, FIG. 9 is an end elevation of the slipper pad of FIG. 8, FIG. 10 is a plan view of the slipper pad of FIG. 8, FIG. 11 is a cross-section of a further form of slipper pad, FIG. 12 is an end elevation of the pad of FIG. 11, and FIGS. 13 to 15 are diagrammatic sections of forms of bearing pad.

Figure 1:
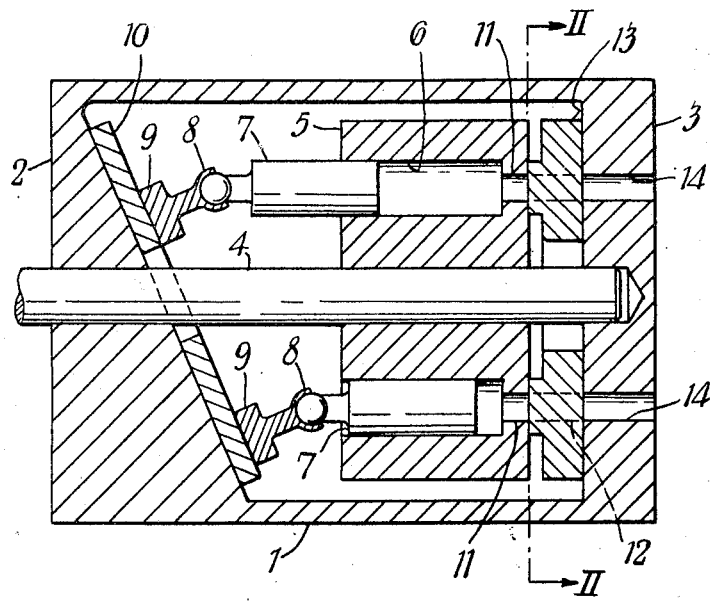
FIG. 1 is a diagrammatic axial section of a fixed displacement axial piston pump of conventional design.
Figure 2:
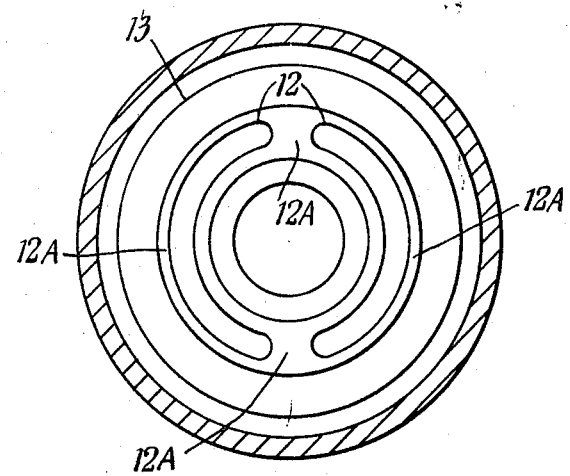
FIG. 2 is a section on the line II—II of FIG. 1 and particularly illustrates the port plate.

Referring firstly to FIGS. 1 and 2, the known form of fixed displacement axial piston pump illustrated includes a body 1 having end walls 2 and 3. A shaft 4 passes axially through the body 1 and is mounted in suitable bearings (not illustrated in detail) in the end walls 2 and 3.

The shaft 4 carriers a cylinder barrel 5 in which a plurality of cylinders 6 are formed. Pistons 7 slide in the cylinders 6 and the left-hand end of each piston 7 (as illustrated in FIG. 1) is connected by a knuckle joint 8 to a slipper pad 9. The left-hand end of each slipper pad 9 slides on a so-called wobble or swash plate 10. The surface of the plate 10 is maintained in a plane which lies at an oblique angle to planes containing the axis of the shaft 4. It will be seen from FIG. 1 that this is achieved by virtue of the shape of the wall 2.

The right-hand end of each cylinder 6 communicates with a port 11 of the barrel 5, and the ports 11 in turn communicate with arcuate ports 12 (FIG. 2) of a port plate 13. The end wall 3 also includes two ports 14 which communicate with the ports 12 of the port plate 13.

The pump illustrated in FIGS. 1 and 2 operates as follows. The barrel 5, together with the pistons 7 and the slipper pads 9 is rotated by the shaft 4 so that the slipper pads 9 slide over the plate 10. Hence the pistons 7 are forced to reciprocate in the cylinders 6 and perform alternate suction and pumping strokes in the cylinders 6. These strokes draw fluid through one of the ports 14 and discharge it through the other port 14 as the barrel 5 rotates. As will be understood, it is possible to use the arrangement shown in FIGS. 1 and 2 as a motor in which event the shaft 4 serves as a power take-off shaft. To drive the shaft fluid under pressure is fed into the cylinders 6 by way of one of the ports 14 and discharged through the other port 14. By making the angle at which the plate 10 is located variable, the structure becomes a variable displacement pump or variable speed motor.

It is well known that in general the total power loss at the port plate 13/cylinder barrel 5 interface is composed of two factors:

(1) The power lost in overcoming friction.
(2) The loss of pressurized fluid from the high pressure region.

Figure 3:
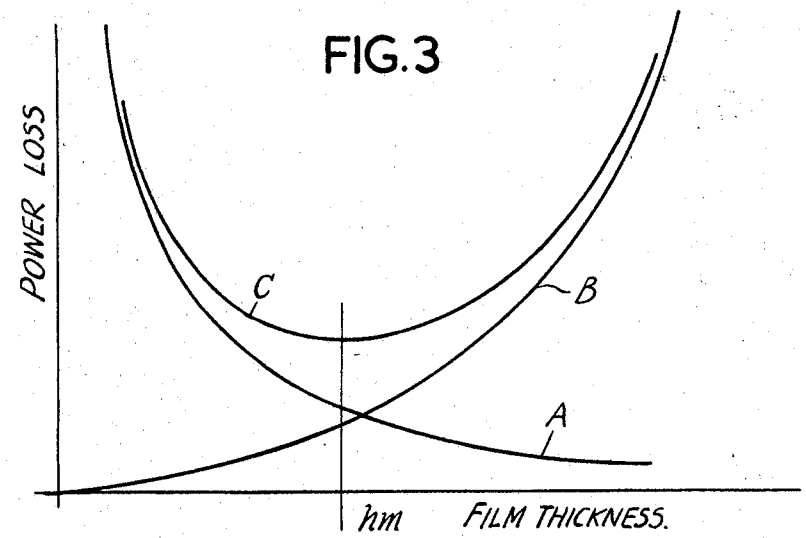
FIG. 3 is a graph illustrating the power loss characteristics at the port plate of the pump of FIGS. 1 and 2.

The relationship between these losses and the thickness of the fluid film separating the valve plate from the cylinder barrel is shown in FIG. 3. Curve A shows the variations of power loss associated with friction and curve B shows the power loss associated with fluid leakage. The total power loss is the sum of these two components and is shown as curve C. Thus there exists a particular film thickness (hm.) where the total power loss is a minimum. Hence, if there is a known unique relationship between load and film thickness for the fluid separating the valve plate and cylinder barrel, it is possible to arrange the size of the components so that the net axial load causes the film thickness to be such that the total power loss is a minimum. Alternatively, if minimum leakage is the criteria then an appropriate film thickness can be achieved at the design stage by varying the component dimensions.

It will be understood that the film thickness (hm.) is between the right-hand surface of the barrel 5 (as illustrated in FIG. 1) and the surfaces 12a (FIG. 2) of the port plate 13 that bound the ports 12. The film in practice has a thickness of $10^{-4}$ to $10^{-3}$ inches.

Similar considerations apply to the slipper pad/plate 10 interfaces.

Figure 4:
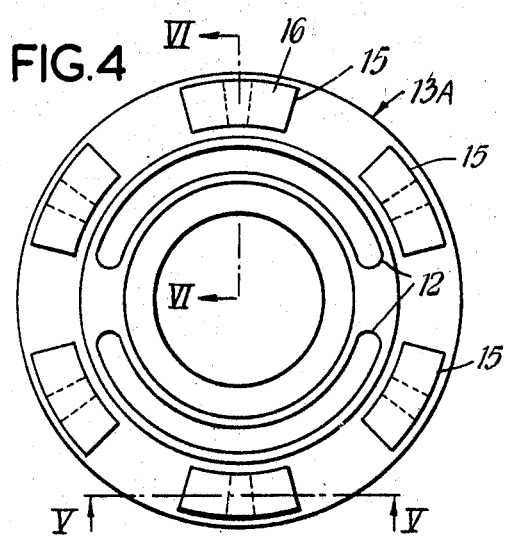
FIG. 4 is a view similar to FIG. 2 and illustrates a modified form of port plate.
Figure 6:
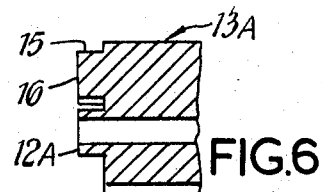
FIG. 6 is a partial section on the line VI—VI of FIG. 4.
Figure 5:
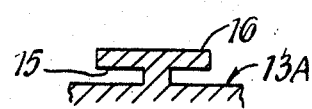
FIG. 5 is a partial section on the line V—V of FIG. 4.

Turning now to FIGS. 4, 5 and 6, the modified form of port plate 13A illustrated therein is formed with a plurality of hydrodynamic bearings pads 15. The pads 15 are arranged in an array, which in the illustrated embodiment is circular, around the periphery of the plate 13A, and each pad 15 is integral with the port plate 13A. The pads 15 each have a bearing surface 16 which, when the port plate of FIG. 4 is mounted in the pump of FIG. 1, faces and co-operates with the right-hand bearing surface of the barrel 5 so that when the barrel 5 is rotated with respect to the port plate 13A, a film that is convergent in the direction of motion is formed as will be explained hereinafter.

As the pads 15 are integral with the port plate 13A it is possible to machine the pads 15 so that the surfaces 16 thereof lie accurately in a common plane. Alternatively, the pads 15 may be separate components that are rigidly secured to the plate 13A. With this construction accurate machining e.g. by grinding and lapping, is still possible.

The conditions that must be fulfilled so that the hydrodynamic thrust bearing will function are:

(a) A supply of lubricant must be available.
(b) There must be a relative sliding velocity between the slider (the barrel 5) and the bearing pad 15.
(c) The lubricant, e.g. oil, film thickness at one part of the gap between the pad and slider must be less than the lubricant film thickness at the inlet to this gap, i.e. the film thickness must be converging in the direction of motion.

If these conditions are fulfilled then the bearing will generate fluid pressure within the film which will support a load without contact occurring between the slider and the bearing pad.

Figure 7:
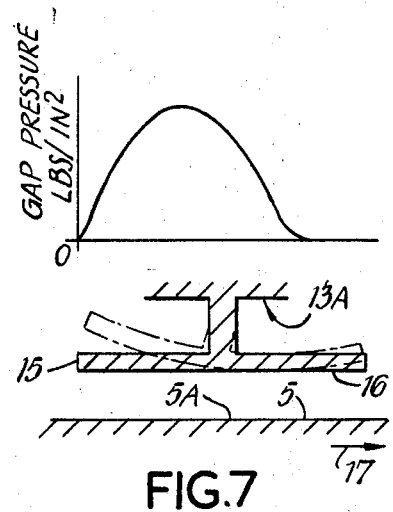
FIG. 7 is a view similar to FIG. 5 and diagrammatically illustrates the manner in which the component of FIG. 5 deflects under load.

Referring now to FIG. 7, it will be assumed that, in use of the pump, the barrel 5 rotates in the direction indicated by the arrow 17. On start-up of the pump or motor, the surfaces 16 are planar and will probably be in contact with the surface 5A of the barrel 5. Most wear occurs at this time but it will be understood that because the whole area of each surface 16 is in contact with the surface 5A, no uneven or differential wear of the surfaces 16 occurs. A film under pressure is created between the relatively moving surfaces 5A and 16 and the pressure of this film causes the pad 15 to deflect from the full-line position shown in FIG. 7 to the dotted-line position. Hence a film which is of greater thickness at the "inlet" to the gap between the surfaces 5A and 16 than at the "outlet" between the surfaces 5A and 16 is formed. The inlet film thickness to minimum film thickness ratio is in the range 1:1.1 to 1:6. Thus, for a minimum film thickness of $2.0 \times 10^{-4}$, the deflection can range between $0.2 \times 10^{-4}$ and $10 \times 10^{-4}$ inches. The pressure distribution in the gap between the surfaces 5A and 16 is indicated in the upper part of FIG. 7. The supply of lubricant to form this film is supplied partly by general leakage between the various mating surfaces and/or by virtue of the provision of a circulating pump intended primarily for cooling purposes. The thickness dimensions of the film formed depend upon the axial load and the rate of rotation of the barrel 5 and, as these can be varied, it is possible to design for a certain film thickness between the surfaces 16 and 5A. Accurate control of this film thickness ensures accurate control of the gap between the surfaces 5A and 12A so that the desired film thickness (hm.) described with reference to FIG. 3 can be obtained. It will be noted that the surface 5A lies in one radial plane so that the surface of the barrel through which the ports 11 open lies in the same radial plane as the surface with which the bearing pads cooperate.

Because the surfaces 16 of the pads 15 lie accurately in one radial plane, unequal load sharing is not a problem as in bearings of the Michell type that employ pads that tilt about fulcrum points. Even more important is the fact that surfaces 16 lie accurately in one radial plane within the surfaces 12A (FIG. 6) that surround the ports 12, this plane and the plane in which the surface 5A lies being parallel.

Each surface 16 has a shape which, in the illustrated embodiment, can be considered to be a short sector of an annular surface, and each pad 15 is connected to the port plate 13A at its central portion so that the pads are T-shaped with two flexible limbs. Other shapes for the surface can be employed i.e. a rectangular shape, and the support for the surface need not be at the centre. Such support can, in fact, lie anywhere between an edge and the centre. If the direction of rotation of the barrel 5 is reversed, then the other limb of the pad 15 will deflect in the same manner as the left-hand limb of the pad 15 is shown deflected under the conditions illustrated in FIG. 7. Of course, if the barrel 5 is only intended to rotate in one direction, then one of the limbs of the pad 15 can be omitted so that the pad will, in effect, be supported at its trailing edge and will deflect along a leading edge portion.

The bearing described can also be used to improve the performance of the slipper pads 9 (FIG. 1). Operationally, a slipper pad is not required to be a seal but in practice it is found convenient to operate it as a bearing where it obtains its supply of high pressure fluid from the pump cylinder. Thus in these circumstances there is a value of the film thickness where the total power loss is a minimum and the bearing described can be applied to the slipper pads directly to obtain this film thickness.

The slipper pad 9A illustrated in FIGS. 8, 9 and 10 is formed with a pair of slots 18 in each of the radially inner and radially outer edges thereof, and with two co-operating slots 20 in the surface thereof that faces the plate 10 (FIG. 1). The slots 18 and 20 together define two hydrodynamic bearing pads 19 each composed of two limbs 20B that project one on each side of a central support 20C. Each bearing pad 19 is thus similar to the bearing pad 15 described with reference to FIGS. 5 and 7 (see particularly FIG. 7). It is necessary to ensure that the slipper pad 9A does not rotate about its own axis thereby to ensure that a pair of the limbs 20B is always leading as the pad rotates about the axis of the shaft 4 (FIG. 1). To this end, a guide 21 is provided.

An axial bore 24 is provided through the piston 7 and slipper pad 9A, this bore terminating at that surface 19B of the pad 9A which slides on the plates 10. The bore 24 provides a supply of lubricant for the hydrodynamic bearing pads 19, and, in addition, the flow of fluid through the bore 24 and then outwardly from the bore 24 to the edges of the pad 9A results in some of the thrust on the pad 9A being carried hydrostatically by the surface 19B. The remainder of the thrust is carried hydrodynamically by virtue of the flexing of the limbs 20B (in the same manner as described in relation to FIG. 7) as the pads 9A rotate with respect to the plate 10. The slots 20 prevent hydrostatic pressure build up on the hydrodynamic pads 19.

The slipper pad 9B illustrated in FIGS. 11 and 12 is similar to the slipper pad 9A except that the hydrodynamic bearing pad 20A is in the form of an annular rim on the pad 9B. No means are required for preventing the pad 9B from rotating about its own axis for a portion of the rim or flange 20A will always constitute the leading edge of the pad 9B and will deflect in the desired manner to form a convergent oil film capable of supporting at least a part of the thrust on the slipper pad 9B. The remainder of the thrust is supported hydrostatically by fluid fed through the bore 24 from the associated cylinder 6. The bores 20D prevent hydrostatic pressure build up on the pad 20A.

Figure 13:
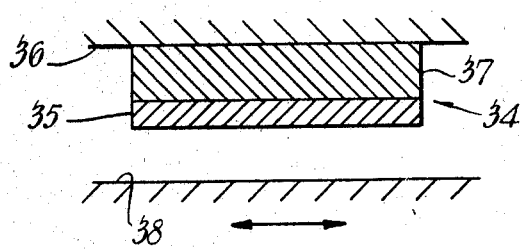

The hydrodynamic pads described above may be replaced by the pads shown in FIGS. 13, 14 and 15. In FIG. 13, the hydrodynamic bearing pad 34 includes an outer pad or layer 35 which sandwiches between itself and the element 36 upon which it is mounted material 37 of low modulus of elasticity. The material 37 can be in layers or can be homogeneous. Alternatively, springs could be used in place of the material 37. It will be understood that the element 36 could be a port plate or a slipper pad. Fluid pressure building up between the outer surface of the layer 35 and the opposing surface 38 causes the material 37 to be subjected to compressive forces and these compressive forces will be so distributed that the pad adopts the desired configuration and a convergent off film is formed. Similarly, if springs are employed then these are compressed to varying degrees.

The material 37 can be of rubber compounds that are compatible with the fluid that forms the film when the pressure is in the order of 1000 lb./sq. in. For higher pressures more rigid material, such as filled epoxy resins or other plastics material, could be employed.

Figure 14:
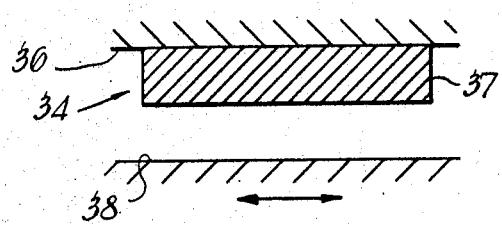

The arrangement of FIG. 14 differs from the arrangement of FIG. 13 only in that the pad 35 has been omitted.

Figure 15:
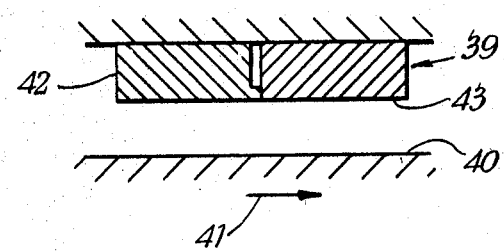

The pads 34 illustrated in FIGS. 13 and 14 will operate in the desired manner regardless of the direction of movement of the surface 38 with respect to the pad. The pad 39 illustrated in FIG. 15 is intended for use where the opposing surface 40 moves in one direction only with respect to the pad 39, i.e. in the direction of the arrow 41. In the figure, the material 42 constituting the leading part of the pad 39 is of different elastic moduli to the material 43 forming the trailing part of the pad 39. For the direction of rotation indicated, the material e.g. steel or other metal constituting the part 43 is more rigid than the material e.g. rubber compound, or plastics material such as epoxy resin, constituting the part 42 so that the material constituting the part 42 will compress to a greater extent than the material constituting the part 43 and give rise to the desired convergent oil film. It is, of course, possible to adapt the arrangement of FIG. 15 for use with a surface 40 which may move either in the direction of the arrow 41 or in the reverse direction by adding, to the right of the part 43, a further part identical to, and of the same material as, the part 42.

A further form of slipper pad according to the invention is similar to the pad 9 of FIG. 1 and consists of a circular disc having a stem projecting axially from one surface thereof. The other end of the stem connects to the knuckle joint. This disc does not have any grooves, slots or apertures in the bearing surface thereof, such as those included in the slipper pad 9B of FIGS. 11 and 12. The following are examples of slipper pads of this type.

Example 1

Disc diameter—0.667"
Disc thickness—0.095"
Stem diameter—0.290"
Material—Beryllium copper Example 2

Disc diameter—0.667"
Disc thickness—0.090"
Stem diameter—0.290"
Material—Manganese bronze.

The circular disc of the slipper pads of this type includes a projecting peripheral annular rim, the edge portion of which, relative to the direction of motion, is deformed during the motion of the slipper pad on the swash plate to form a lubricant film of non-uniform thickness.

We claim:
1. A piston pump or motor comprising:
  (a) first and second components which are relatively rotatable with respect to one another,
  (b) one of said components comprising a slider having a bearing surface
  (c) and the other of said components including a bearing pad having a bearing surface facing the bearing surface of the slider,
  (d) said bearing pad being constituted by an element having a first portion which is free to deflect under the influence of fluid pressure and a second portion which connects the first portion to the remainder of said other component, one surface of said first portion constituting said bearing surface of the bearing pad,
  (e) said element being T-shaped, the crossbar of the T being constituted by said first portion and the upright of the T being constituted by said second portion whereby the bearing pad is provided with two deflectable limbs, and
  (f) the bearing pad being adapted to deform under the action of the pressure of a liquid film which is created between the bearing surfaces of the pad and the slider upon relative motion occurring between the pad and the slider, whereby said film is of non-uniform thickness and is convergent in the direction of motion of the slider with respect to the pad.

2. A piston pump or motor comprising:
  (a) first and second components which are relatively rotatable with respect to one another,
  (b) one of said components comprising a slider having a bearing surface
  (c) and the other of said components including a bearing pad having a bearing surface facing the bearing surface of the slider, (d) the bearing pad being composed of compressible material of low modulus of elasticity which material is compressed by the pressure of a fluid film which is created between the bearing surfaces of the pad and slider to form a film of non-uniform thickness, (e) the bearing pad being adapted to deform under the action of the pressure of the liquid film created between the bearing surfaces of the pad and the slider upon relative motion occurring between the pad and the slider, whereby said film of non-uniform thickness is convergent in the direction of motion of the slider with respect to the pad, and (f) wherein said bearing pad includes a leading portion, relative to said direction of motion, which is of said material and a trailing portion which is of material of higher modulus of elasticity, whereby the leading portion is compressed to a greater extent than the trailing portion to give rise to said film of non-uniform thickness.

3. A piston pump or motor comprising:

(a) first and second pump components which are relatively rotatable with respect to one another, (b) one of said components comprising a slider having a bearing surface, (c) and the other of said components including a bearing pad having a bearing surface facing the bearing surface of the slider, (d) said bearing pad being a T-shaped element in cross-section having a cross-member providing the bearing surface of the pad with opposing deflectable parts, said element having a stem connecting the cross-member to the remainder of said other component, and wherein (e) the cross member of the bearing pad is adapted to deform under the action of the pressure of a liquid film which is created between the bearing surfaces of the pad and slider upon relative motion occurring between the pad and the slider, whereby said film is of non-uniform thickness and is convergent in the direction of motion of the slider with respect to the pad.

References Cited

UNITED STATES PATENTS

| | | | |
|---|---|---|---|
| 1,735,315 | 11/1929 | Fulpius | 308—160 |
| 2,424,028 | 7/1947 | Haeberlein | 308—160 XR |
| 3,004,804 | 10/1961 | Pinkus et al. | 308—73 |
| 3,036,434 | 5/1962 | Mark | 103—162 XR |
| 3,289,606 | 12/1966 | Bosch | 103—162 |
| 3,395,948 | 8/1968 | Andrews | 103—162 XR |

WILLIAM L. FREEH, Primary Examiner

U.S. Cl. X.R.

308—73, 170; 91—499; 92—153